US012383939B2

(12) United States Patent
Baranko

(10) Patent No.: US 12,383,939 B2
(45) Date of Patent: Aug. 12, 2025

(54) OILFIELD TUBING CLEANING

(71) Applicant: Baranko Environmental LLC, Dickinson, ND (US)

(72) Inventor: Glenn Baranko, Dickinson, ND (US)

(73) Assignee: Baranko Environmental LLC

( * ) Notice: Subject to any disclaimer, the term of this patent is extended or adjusted under 35 U.S.C. 154(b) by 402 days.

(21) Appl. No.: 18/171,879

(22) Filed: Feb. 21, 2023

(65) Prior Publication Data

US 2024/0278294 A1 Aug. 22, 2024

(51) Int. Cl.
*B08B 9/032* (2006.01)

(52) U.S. Cl.
CPC ...... *B08B 9/0321* (2013.01); *B08B 2209/027* (2013.01)

(58) Field of Classification Search
CPC ...................................................... B08B 3/021
See application file for complete search history.

(56) References Cited

U.S. PATENT DOCUMENTS

| | | | |
|---|---|---|---|
| 332,910 | A | 12/1885 | Klein |
| 1,840,334 | A | 1/1932 | Schuster |
| 2,751,480 | A | 6/1956 | Eisen |
| 3,958,049 | A | 5/1976 | Payne |
| 4,045,591 | A | 8/1977 | Payne |
| 4,307,276 | A | 12/1981 | Kurata et al. |
| 4,418,259 | A | 11/1983 | Lewis |
| 4,420,667 | A | 12/1983 | Lewis |
| 4,433,226 | A | 2/1984 | Wagar |
| 4,442,331 | A | 4/1984 | Watanabe |
| 4,468,261 | A | 8/1984 | Woodings |
| 4,482,793 | A | 11/1984 | Lewis |
| 4,494,607 | A | 1/1985 | Ford et al. |
| 4,501,942 | A | 2/1985 | Lewis |
| 4,877,386 | A | 10/1989 | Hinds et al. |
| 5,217,069 | A | 6/1993 | Badon |
| 5,280,825 | A | 1/1994 | Cholet |
| 6,070,285 | A | 6/2000 | Geppert |
| 6,397,864 | B1 | 6/2002 | Johnson |
| 6,455,825 | B1 | 9/2002 | Bentley et al. |

(Continued)

FOREIGN PATENT DOCUMENTS

| | | |
|---|---|---|
| CN | 103276185 B | 8/2014 |
| EP | 1375680 A1 | 1/2004 |

OTHER PUBLICATIONS

Liu Dan et al., CN103276185 B, Machine Translation produced by Espacenet.com (Year: 2022).

(Continued)

*Primary Examiner* — Jason Y Ko

(74) *Attorney, Agent, or Firm* — Brian D. Kaul; Westman, Champlin & Koehler, P.A.

(57) ABSTRACT

In a method of removing scale deposits from a used oilfield tube having first and second threaded ends, a coupling collar is unscrewed one or more rotations from a first threaded end about a longitudinal axis of the oilfield tube without detaching the coupling collar from the first threaded end. A spray of water is discharged through a spray tip of a lance. The spray tip is fed along the longitudinal axis from the collar to the second threaded end using a lance feeder, wherein the spray tip travels through a bore of the collar and the interior of the oilfield tube. Scale deposits are removed from the bore of the collar and the interior of the oilfield tube using the spray of water during the feeding of the lance.

10 Claims, 5 Drawing Sheets

(56) References Cited

U.S. PATENT DOCUMENTS

| | | | |
|---|---|---|---|
| 6,840,315 | B2 | 1/2005 | Jarchau et al. |
| 7,314,083 | B1 | 1/2008 | Martini |
| 7,985,938 | B2 | 7/2011 | Johnson |
| 8,900,372 | B2 | 12/2014 | White |
| 8,920,570 | B2 | 12/2014 | White |
| 8,931,558 | B1 | 1/2015 | Harper |
| 9,167,632 | B2 | 10/2015 | Weiss et al. |
| 9,278,412 | B2 | 3/2016 | Johnson et al. |
| 9,840,893 | B2 | 12/2017 | Johnson |
| 9,869,135 | B1 | 1/2018 | Martin |
| 10,195,699 | B2 | 2/2019 | Johnson et al. |
| 11,524,320 | B2 | 12/2022 | Fike |
| 2008/0149622 | A1 | 6/2008 | Weiss et al. |
| 2008/0197168 | A1 | 8/2008 | Horino et al. |
| 2011/0036138 | A1 | 2/2011 | Dial et al. |
| 2011/0297832 | A1 | 12/2011 | Yao et al. |
| 2012/0305234 | A1 | 12/2012 | Vowels |
| 2013/0153303 | A1 | 6/2013 | Angelle et al. |
| 2013/0192682 | A1 | 8/2013 | Freese |
| 2013/0316173 | A1 | 11/2013 | Moore et al. |
| 2014/0053404 | A1 | 2/2014 | Johnson et al. |
| 2014/0124001 | A1 | 5/2014 | White |
| 2015/0047673 | A1 | 2/2015 | White |
| 2016/0151819 | A1 | 6/2016 | Johnson et al. |
| 2019/0169706 | A1 | 6/2019 | Liu et al. |
| 2019/0211633 | A1 | 7/2019 | Badrak |
| 2021/0008607 | A1 | 1/2021 | Fike |
| 2021/0025247 | A1 | 1/2021 | Ford |

OTHER PUBLICATIONS

Declaration of Glenn Baranko, inventor of subject matter disclosed and claimed in U.S. Appl. No. 18/171,879, filed Feb. 21, 2023, dated Jan. 10, 2024.

OILFIELD TUBING CLEANING

FIELD

Embodiments of the present disclosure generally relate to systems and methods for cleaning and decontaminating used oilfield tubes and, more specifically, to oilfield tube cleaning systems and methods utilizing jetted water.

BACKGROUND

Oil and gas extraction and processing operations use sucker rods to join surface and downhole components of a reciprocating piston pump installed in an oil well. Sucker rods are rigid rods that typically extend between 25-30 feet in length through oilfield tubing within a bore of a well and are used to lift fluid and materials out of the well.

The oilfield tubing generally lines the casing of the wellbore. The oilfield tubes may be joined together to extend to a desired length, such as using couplings that attach to threaded ends of the oilfield tubes.

During use, the oilfield tubing and sucker rods accumulate scale and other deposits (hereinafter "scale deposits"). The scale deposits may include naturally occurring radioactive material at concentrations above normal in by-product waste streams. Because the extraction process concentrates the naturally occurring radionuclides and exposes them to the surface environment and human contact, these scale deposits are classified as Technologically Enhanced Naturally Occurring Radioactive Material (TENORM).

The primary radionuclides of concern in oil and gas TENORM are radium-226 and radium-228. These isotopes are the decay products of uranium and thorium isotopes that are present in subsurface formations from which hydrocarbons are produced. The source for most oil and gas TENORM is dissolved radium that is transported to the surface in a water waste stream. The dissolved radium remains in solution in the produced water, coprecipitates with barium, strontium, or calcium to form a hard sulfate deposit. These radioactive scale deposits lead to disposal problems when the equipment is taken off-line for repair or replacement.

It is desirable to remove such scale deposits from used oilfield tubing and sucker rods prior to reusing or disposing of the components. Exemplary conventional techniques for cleaning oilfield tubing and sucker rods include scraping, brushing, applying chemical compounds, media blasting, and other processes. U.S. Pat. No. 11,524,320, which issued to Baranko Environmental LLC, discloses a sucker rod cleaning technique involving inductive heating of the sucker rod.

SUMMARY

Embodiments of the present disclosure are directed to methods and systems for cleaning used oilfield tubing to remove scale deposits. Each used oilfield tube has first and second threaded ends and a hollow interior. A coupling collar having a threaded bore is screwed onto the first threaded end.

In one embodiment of the method, the coupling collar is unscrewed one or more rotations from the first threaded end about a longitudinal axis of the oilfield tube without detaching the coupling collar from the first threaded end. A wet decontamination operation is performed, which includes: discharging a spray of water through a spray tip of a lance; feeding the spray tip of the lance along the longitudinal axis from the collar to the second threaded end using a lance feeder during the discharging of the spray of water, wherein the spray tip travels through the bore of the collar and the interior of the oilfield tube; and removing scale deposits from the bore of the collar and the interior of the oilfield tube using the spray of water during the feeding of the lance.

One embodiment of the system includes a bucking unit, a pressurized water source, a lance, a lance feeder and a controller. The bucking unit is configured to unscrew a coupling collar connected to a threaded end of a used oilfield tube. The pressurized water source is configured to generate a flow of pressurized water. The lance is configured to receive the flow of pressurized water at a proximal end and discharge a spray of the water through a spray tip at a distal end. The lance feeder is configured to move the lance along a longitudinal axis. The controller is configured to control the pressurized water source and the lance feeder.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
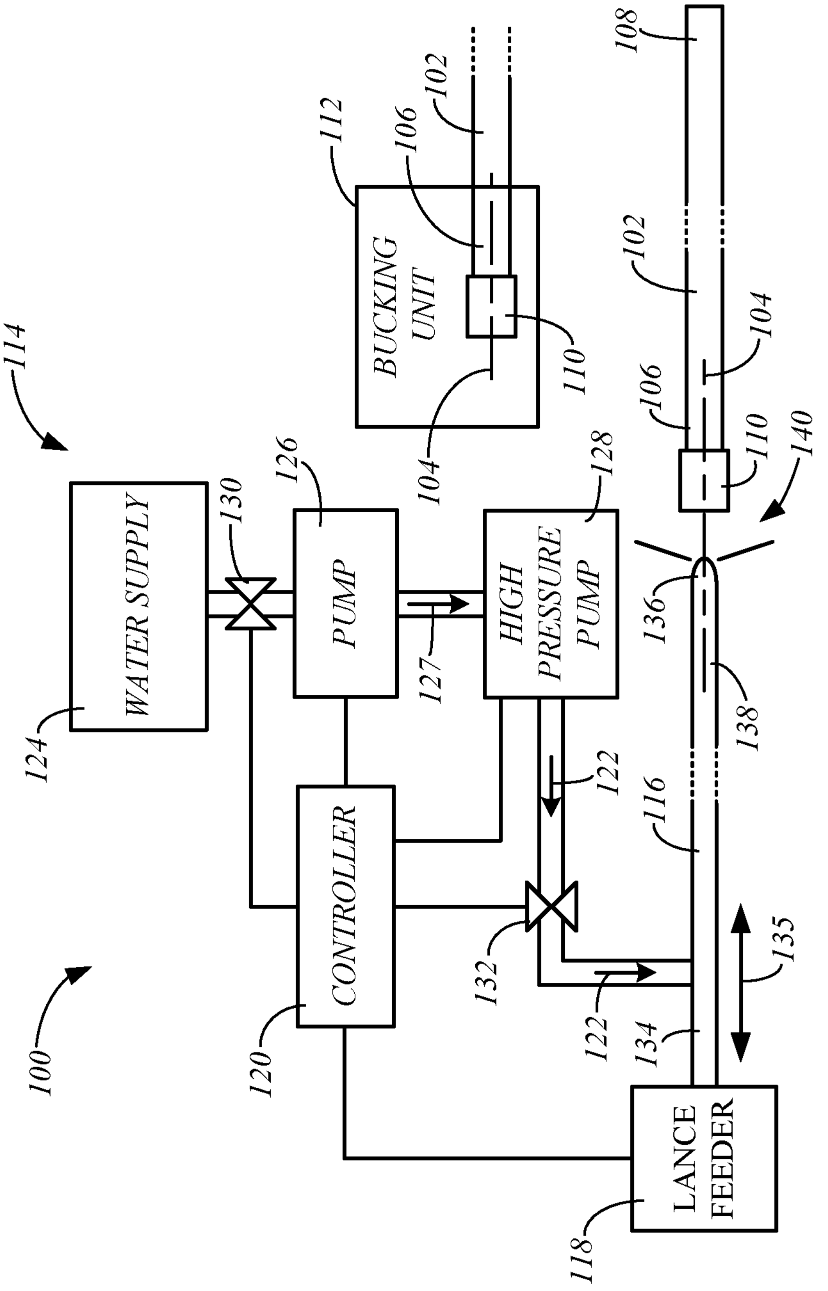
FIG. 1 is a simplified drawing of an oilfield tube cleaning system that is configured to clean an oilfield tube, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Embodiments of the present disclosure include systems and methods for cleaning used oilfield tubes that operate to join surface and downhole or borehole components of an oil or gas extraction system, such as components of a reciprocating piston pump, for example. FIG. 1 is a simplified drawing of an oilfield tube cleaning system 100 that is configured to clean a used oilfield tube 102, in accordance with embodiments of the present disclosure.

The used oilfield tube 102 may be in accordance with conventional oilfield tubes, which are typically formed of iron or steel. The oilfield tube 102 is generally a hollow cylinder having a longitudinal axis 104, and may have a diameter of approximately 2.375-4.5 inches, threaded ends 106 and 108, and a length of approximately 18-45 feet. A coupling collar 110 that is used to join the ends of a pair of oilfield tubes together, may be screwed onto one of the ends of the oilfield tube, such as the end 106 as shown in FIG. 1.

Embodiments of the system 100 may also include a bucking unit 112, a pressurized water source 114, one or more rigid lances 116, a lance feeder 118, and a controller 120. The bucking unit or make-break unit 112 is a conventional device used to screw or unscrew connected items using an electric motor or a hydraulic actuator. As discussed below in greater detail, the bucking unit 112 is configured to rotate the collar 110 about the axis 104 relative to the oilfield tube 102 to unscrew the collar 110 a few rotations from the end 106 of the oilfield tube 102 prior to cleaning the interior of the oilfield tube 102.

The pressurized water source 114 is configured to generate a flow of pressurized water 122, and may comprise a supply of water 124, a pump 126 (e.g., three-quarter horsepower pump) used to transport water from the supply 124, and/or a high pressure pump 128 (e.g., waterjet system pump) that receives water 127 from the pump 126 and pressurizes the water 127 to form the flow 122 for the oilfield tube cleaning or wet decontamination operation. The flow of pressurized water 122 supplied by the high pressure pump 128 may have a pressure of greater than 10 kilopounds per-square-inch (kpsi), greater than 30 kpsi, or greater than 50 kpsi. In one embodiment, the pressurized water source utilizes a 55 kpsi waterjet pump. The water flow 122 may be controlled using one or more valves, such as valves 130 and 132, for example.

The pressurized water source 114 may also include suitable connectors, manifolds, tumble boxes, and/or other components for generating and delivering the pressurized water flow 122 to a proximal end 134 of one or more of the lances 116, such as two or three lances. When multiple lances 116 are utilized, the cleaning operation may be performed simultaneously on the corresponding number of oilfield tubes 102.

The pressurization of the water generally heats the water. In some embodiments, the pressurized water source 114 may include supplemental heaters for further heating the water flow 122 to enhance the cleaning or decontaminating power of the flow 122.

Suitable water capture components and tanks may be used to collect the discharged wastewater flowing from the oilfield tube, such as at the end 108. The wastewater may be processed (e.g., filtered, cooled, etc.) for containment and disposal, or reuse.

The lance feeder 118 is configured to feed one or more of the lances 116 relative to the oilfield tubes 102 being cleaned during a cleaning or decontamination operation, as indicated by arrow 135. The lance feeder 118 may take on any suitable form. In one example, the lance feeder 118 supports one or more of the lances 116 on a carrier that is driven along the longitudinal axis 104 to feed each lance 116 through the interior of the corresponding oilfield tube 102, as the oilfield tube is supported in a fixed position. Alternatively, a similar feed mechanism may be used to feed the oilfield tubes 102 relative to the lances 118.

Each lance 116 may be a rigid unit having a spray tip 136 at a distal end 138, through which the flow of pressurized water 122 is discharged as a high velocity water spray or jetted water 140. The spray tip 136 may comprise one or more nozzles or openings for directing the spray 140 against the interior of the oilfield tube, such as in a direction that is transverse to the longitudinal axis 104, as indicated in FIG. 1.

In some embodiments, the controller 120 may be used to control components of the system 100 to perform an oilfield tube cleaning or wet decontamination operation. Thus, the controller 120 may be configured to control the bucking unit 112 to screw or unscrew the collar 110, the pressurized water source (e.g., the pumps, valves, etc.) 114 to generate the flow of pressurized water 122, the lance feeder 118 to feed one or more lances 116, and/or other functions described herein to perform an oilfield tube cleaning or wet decontamination operation.

Figure 2:
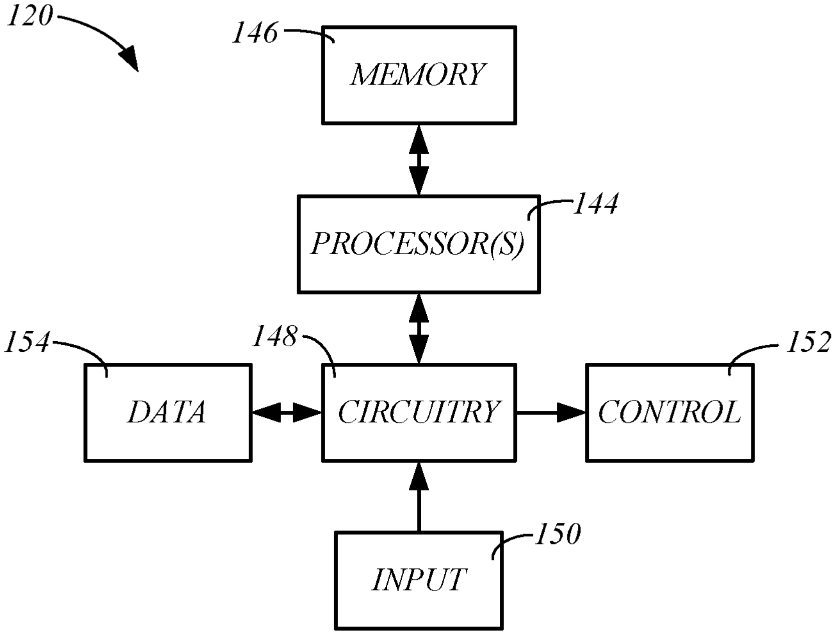
FIG. 2 is a simplified diagram of an example of the controller, in accordance with embodiments of the present disclosure.

FIG. 2 is a simplified diagram of an example of the controller 120, in accordance with embodiments of the present disclosure. The controller 120 may include one or more processors 144 configured to perform various functions of the described herein, in response to their execution of instructions contained in memory 146. The one or more processors 144 may be components of one or more computer-based systems, and may include one or more control circuits, microprocessor-based engine control systems, and/or one or more programmable hardware components, such as a field programmable gate array (FPGA). The memory 146 represents local and/or remote memory or computer readable media. Such memory 146 comprises any suitable patent subject matter eligible computer readable media and does not include transitory waves or signals. Examples of the memory 146 include conventional data storage devices, such as hard disks, CD-ROMs, optical storage devices, magnetic storage devices and/or other suitable data storage devices. The controller 120 may include circuitry 148 for use by the one or more processors 144 to receive input signals 150, and issue control signals 152, such as signals that control the bucking unit 112, the pump 126, the pump 128, the valve 130, the valve 132, and/or other components of the system 100 to perform a wet decontamination operation in accordance with embodiments of the present disclosure. The circuitry 148 may also be used to communicate data 154, such as in response to the execution of the instructions stored in the memory 146 by the one or more processors 144.

Figure 3:
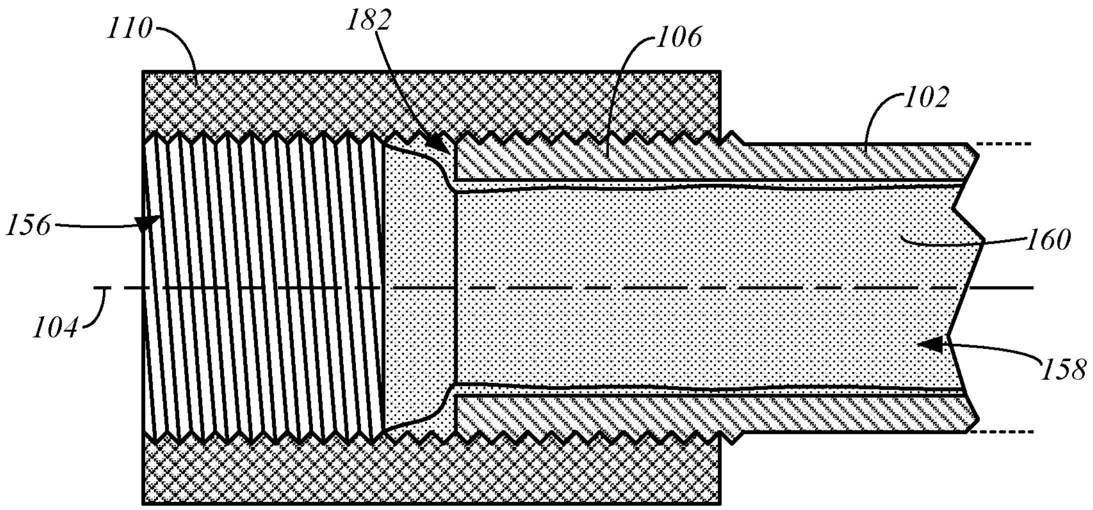
FIG. 3 is a simplified cross-sectional view of an example of an end of a used sucker rod, in accordance with embodiments of the present disclosure.

FIG. 3 is a simplified cross-sectional view of an example of the threaded end 106 of the used oilfield tube 102, to which the coupling collar 110 is connected. The coupling collar includes a threaded bore 156 that is screwed onto the end 106. The oilfield tube 102 and threaded bore 156 of the coupling collar 110 include a hollow interior 158. Scale deposits 160 are attached to the interior wall of the oilfield tube 102 and the threaded bore 156.

Figure 4:
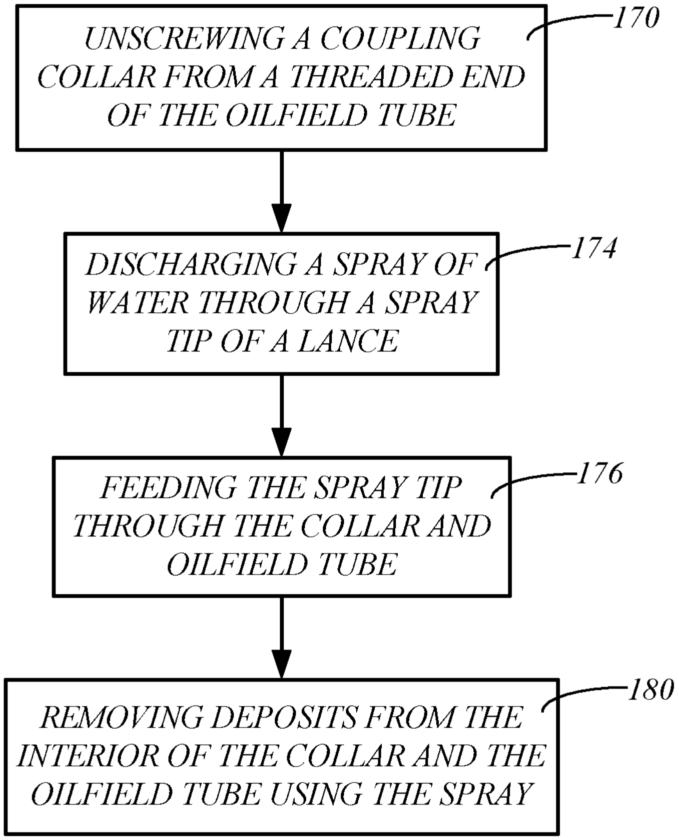
FIG. 4 is a flowchart illustrating a method of cleaning a used sucker rod, in accordance with embodiments of the present disclosure.

Embodiments of the present disclosure relate to methods of cleaning or decontaminating the used oilfield tube 102 and coupling collar 110 to remove the deposits 160 and prepare the oilfield tube 102 for reuse. FIG. 4 is a flowchart illustrating the method, in accordance with embodiments of the present disclosure.

At 170 of the method, the coupling collar 110 is unscrewed from the threaded end 106. In some embodiments, this involves rotating the collar 110 about the longitudinal axis 104 relative to the oilfield tube 102 without detaching the collar 110 from the threaded end 106 of the oilfield tube 102, as illustrated in the simplified side cross-sectional view of FIG. 5. Thus, in one embodiment of step 170, the threaded bore 156 of the collar 110 remains in threaded engagement with the threaded end 106.

Figure 5:
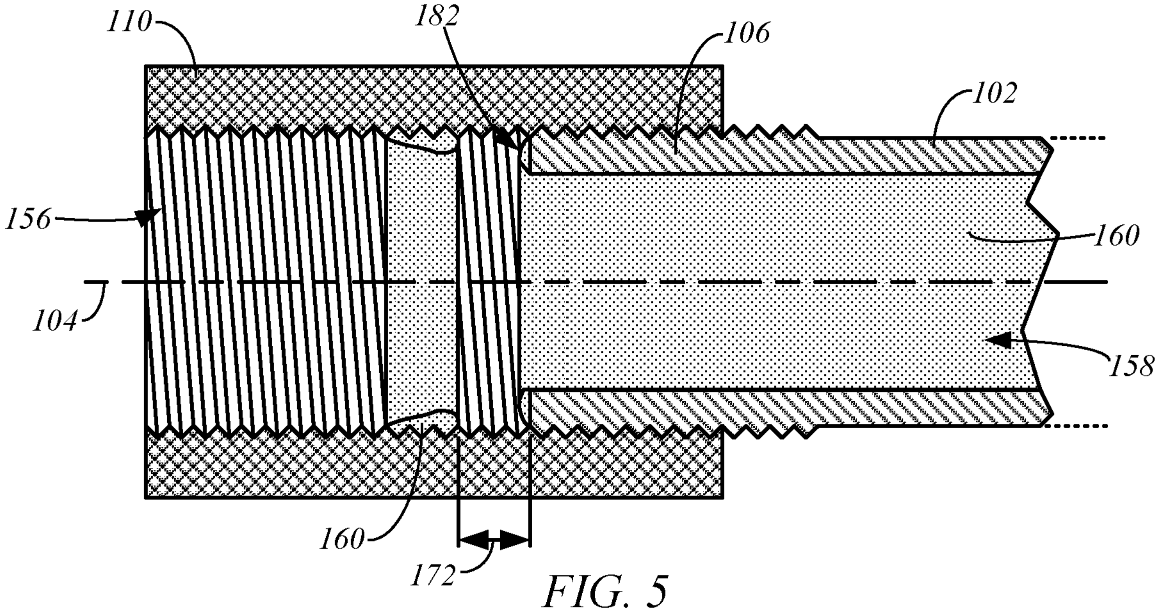
FIG. 5 is a simplified cross-sectional view of an example of the end of the used sucker rod of FIG. 4 after the collar has been unscrewed, in accordance with embodiments of the present disclosure.

In some embodiments, the collar 110 is unscrewed in step 170 by rotating the collar 110 two or more rotations, such as 2-5 rotations, about the longitudinal axis 104 relative to the oilfield tube 102. This displaces the collar 110 a distance 172 relative to the oilfield tube 102 along the axis 104, as indicated in FIG. 5. In some embodiments, the distance 172 is approximately 0.25-1.5 inches.

In some embodiments, the coupling collar 110 is unscrewed in step 170 using the bucking unit 112. After collar 110 is initially unscrewed using the bucking unit 112, the collar 110 may be further rotated in step 170 relative to the oilfield tube 102 by hand until the collar 110 is unscrewed the desired distance 172 relative to the oilfield tube 102.

A cleaning or wet decontamination operation is then performed to clean the bore 156 of the collar and the interior 158 of the oilfield tube 102. Steps of the wet decontamination operation are illustrated in the simplified side views of FIGS. 6A-D.

Figure 6A:
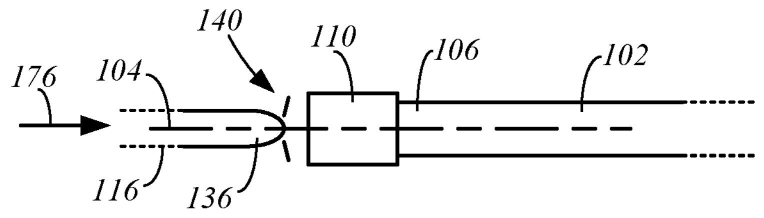
FIGS. 6A-D are simplified side views of various stages of an oilfield tube cleaning or wet decontamination process, in accordance with embodiments of the present disclosure.

At 174 of the method, a spray 140 of water is discharged through the spray tip 136 of the lance 116, as shown in FIG. 6A. As discussed above, this is implemented using the pressurized water source 114 that drives the flow of pressurized water 122 through the lance 116. The spray tip 136 may be positioned outside the collar 110 at the start of the discharging step 174, as indicated in FIG. 6A.

Figure 6B:
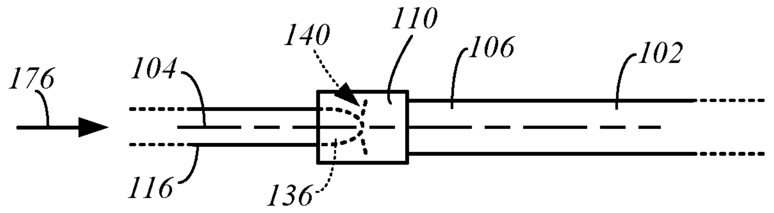
Figure 6C:
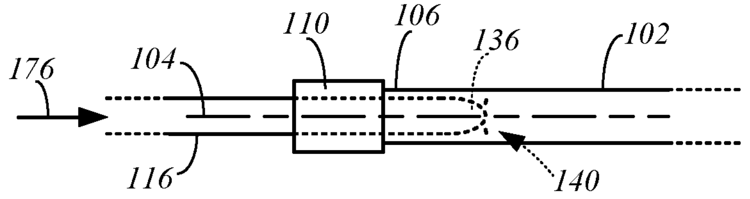
Figure 6D:
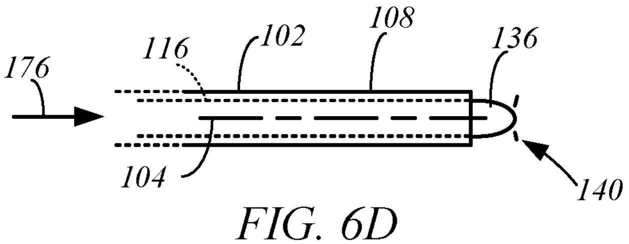

At 176 of the method, the spray tip 136 is fed along the longitudinal axis 104 by the lance feeder 118 toward the collar 110 and threaded end 106 of the oilfield tube 102 as indicated by arrow 176 in FIG. 6A, and advanced into the threaded bore 156 of the collar 110 and the interior 158 of the oilfield tube 102, as indicated in FIG. 6B, during the discharging step 174. This ensures that the full interior of the threaded bore 156 receives the spray 140. The spray tip 136 may continue to be fed during step 176 through the interior 158 (FIG. 6C) and through the end (FIG. 6D) while discharging the spray 140. It is understood that this process may be performed on an oilfield tube that has an orientation that is the reverse of that illustrated in FIGS. 1 and 6A-B, such that the threaded end 108 initially receives the spray tip 136 during the feeding step 176.

Figure 7:
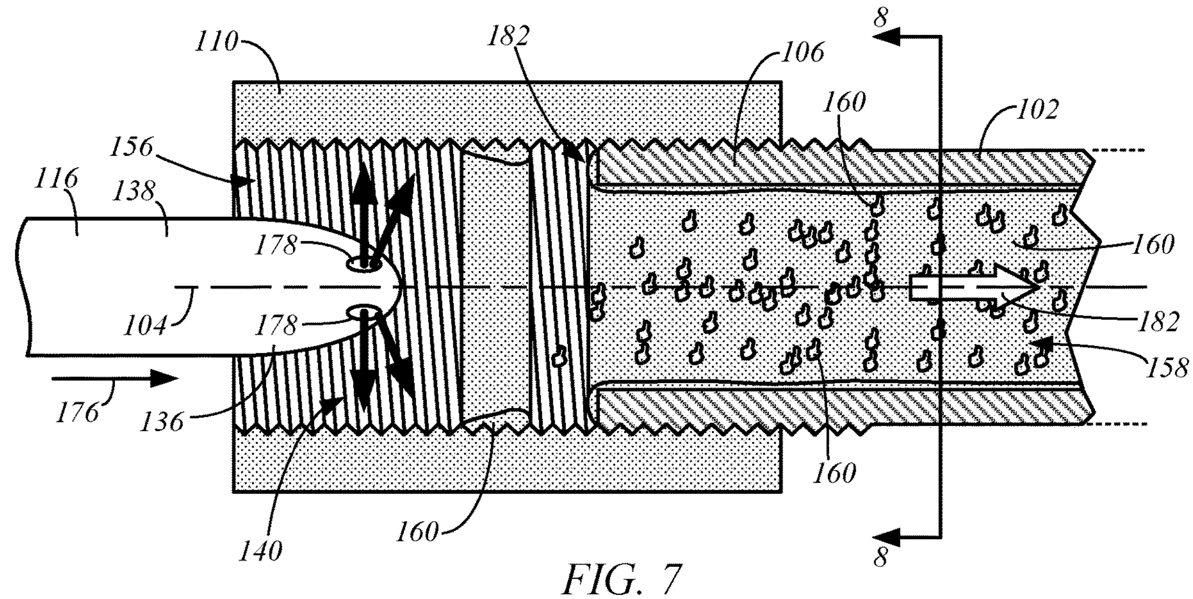
FIG. 7 is a simplified side cross-sectional view of the collar and threaded end of the oilfield tube during a wet decontamination process, in accordance with embodiments of the method.
Figure 8:
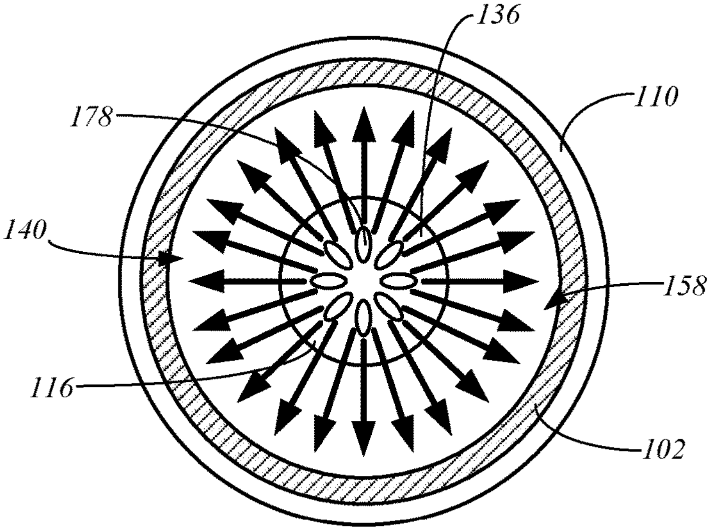
FIG. 8 is a simplified cross-sectional view taken generally along line 8-8 of FIG. 7.

FIG. 7 is a simplified side cross-sectional view of the collar 110 and the threaded end 106 of the oilfield tube 102 during the feeding step 176 of the method. FIG. 8 is a simplified cross-sectional view taken generally along line 8-8 of FIG. 7. As shown in FIGS. 7 and 8, the spray tip 136 includes one or more nozzles or openings 178 that discharge the high-velocity spray 140 in a transverse direction relative to the longitudinal axis 104, such as 45-90 degrees relative to the longitudinal axis 104. The velocity of the water in the spray 140 may be approximately 300-700 miles per hour. It is understood that while the spray tip is illustrated as comprising several individual nozzles or openings 178, any suitable nozzle tip may be used, such as a single nozzle tip that is configured to discharge the spray at approximately 360 degrees around the longitudinal axis 104, for example.

As the spray tip 136 is fed along the axis 104 through the collar 110 and the oilfield tube 102 (FIGS. 6A-D), scale deposits 160 attached to the bore 156 of the collar 110 and the interior wall of the oilfield tube 102 are dislodged and removed by the spray 140, as indicated at step 180 of the method, and illustrated in FIG. 7. The dislodged deposits 160 are driven out of the oilfield tube 102 by a flow of wastewater 182 (FIG. 7) through the oilfield tube 102 generated by the spray 140. The wastewater 182 may be collected and processed by the system 100 as discussed above.

In some embodiments, the feeding step 176 of the wet decontamination operation involves multiple passes of the spray tip 136 through the collar 110 and oilfield tube 102 while discharging the spray of water (step 174). Thus, the feeding step 176 may include feeding the lance 116 and the spray tip 136 along the longitudinal axis 104 in the opposite direction indicated by arrow 176 in FIGS. 6A-D using the lance feeder 118 while continuing to discharge the spray 140. This movement of the lance 116 may be repeated as necessary to completely or substantially remove the deposits 160 (step 180).

The inventors have discovered that the unscrewing step 170 improves the removal (step 180) of the deposits 160 during the discharging step 174 and the feeding step 176, particularly on the end face 182 of the threaded end 106 of the oilfield tube 102 and the threaded bore 156 that was initially located adjacent to the end face 182 prior to the unscrewing step 170. This may be due to an increase in the exposure of the deposits 160 at those locations.

The wet decontamination process may be terminated by stopping the flow of pressurized water 122 by deactivating the pump 126, deactivating the pump 128, closing the valve 130, and/or closing the valve 132 using the controller 120, for example. Additionally, the lance 116 may be removed from the oilfield tube 102 back to the position shown in FIGS. 1 and 6A using the lance feeder 118. The cleaned and decontaminated oilfield tube 102 and attached coupling collar 110 may then be moved to a collection area for inspection.

In one embodiment, the bucking unit 112 is used to tighten the coupling collar 110 onto the threaded end 106 of the decontaminated oilfield tube 102. This prepares the sucker rod 102 for reuse in the field.

Although the embodiments of the present disclosure have been described with reference to preferred embodiments, workers skilled in the art will recognize that changes may be made in form and detail without departing from the spirit and scope of the present disclosure.

What is claimed is:

1. A method of removing scale deposits from a used oilfield tube having a hollow interior, first and second threaded ends, and a coupling collar having a threaded bore screwed over the first threaded end, the method comprising:

unscrewing the coupling collar one or more rotations from the first threaded end about a longitudinal axis of the oilfield tube without detaching the coupling collar from the first threaded end; and performing a wet decontamination operation on the threaded bore and the interior of the oilfield tube comprising:

discharging a spray of water through a spray tip of a lance;

feeding the spray tip of the lance along the longitudinal axis from the collar to the second threaded end using a lance feeder during the discharging of the spray of water, wherein the spray tip travels through the bore of the collar and the interior of the oilfield tube; and removing scale deposits from the bore of the collar and the interior of the oilfield tube using the spray of water during the feeding of the lance.

2. The method of claim 1, wherein discharging the spray of water comprises pumping the water through the lance using a pump.

3. The method of claim 2, wherein pumping the water through the lance comprises delivering a flow of water to the lance that is pressurized to greater than 30 kpsi using a high pressure pump.

4. The method of claim 1, wherein unscrewing the coupling collar comprises unscrewing the coupling collar using a bucking unit.

5. The method of claim 4, wherein unscrewing the coupling collar comprises rotating the collar 2-5 rotations about the longitudinal axis relative to the oilfield tube.

6. The method of claim 5, comprising screwing the collar one or more rotations onto the first threaded end about the longitudinal axis after performing the wet decontamination operation.

7. The method of claim 6, wherein screwing the collar one or more rotations onto the first threaded end comprises screwing the collar using a bucking unit.

8. An oilfield tube cleaning system comprising:

a bucking unit configured to unscrew a coupling collar connected to a threaded end of a used oilfield tube;

a pressurized water source configured to generate a flow of pressurized water;

a lance configured to receive the flow of pressurized water at a proximal end and discharge a spray of the water through a spray tip at a distal end;

a lance feeder configured to move the lance along a longitudinal axis; and a controller configured to control the pressurized water source and the lance feeder.

9. The oilfield tube cleaning system of claim 8, wherein the pressurized water source comprises:

a supply of water; and a high pressure pump configured to receive a flow of water from the supply and discharge the flow of pressurized water.

10. The system of claim 9, wherein the high pressure pump is configured to discharge the flow of pressurized water having a pressure of greater than 30 kpsi.

* * * * *